Figure 7:
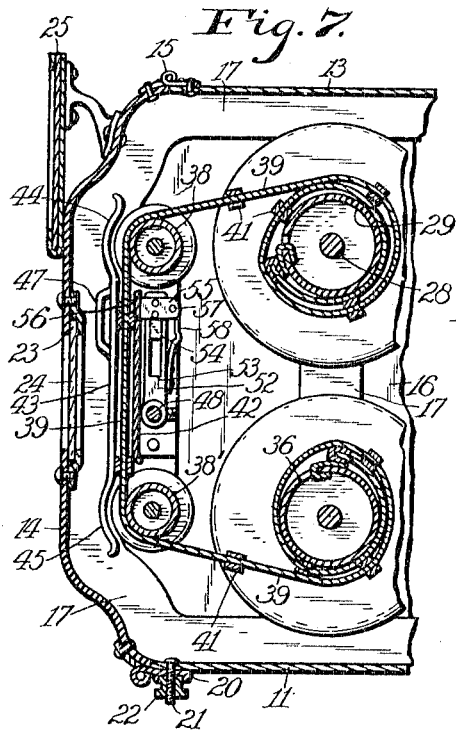

B. R. SKINNER.
STATION INDICATOR OR ADVERTISER.
APPLICATION FILED AUG. 28, 1912.
1,120,338.
Patented Dec. 8, 1914.
3 SHEETS—SHEET 1.
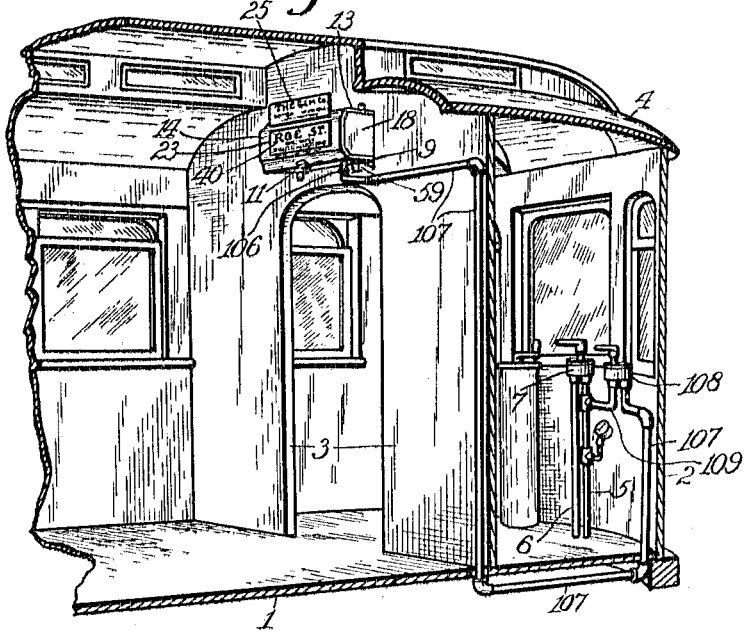
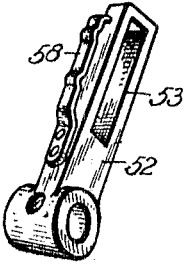
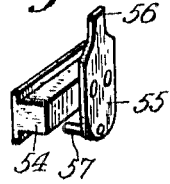
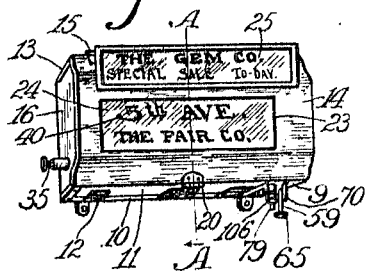
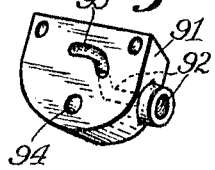
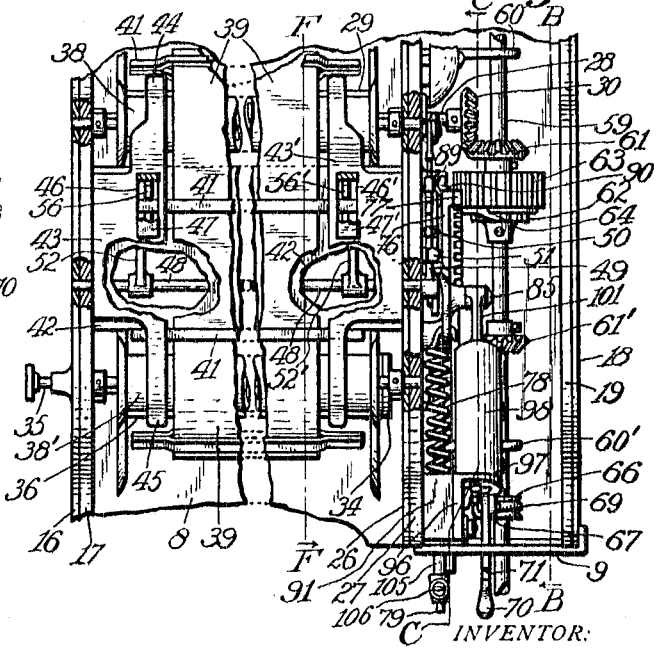
WITNESSES:
J. H. Gardner
M. J. Messenheimer
INVENTOR:
Burr R. Skinner,
BY
E. T. Silvius,
ATTORNEY.

B. R. SKINNER.
STATION INDICATOR OR ADVERTISER.
APPLICATION FILED AUG. 28, 1912.

1,120,338.

Patented Dec. 8, 1914.
3 SHEETS—SHEET 2.

WITNESSES:
J. H. Gardner.
M. J. Messenheimer.

INVENTOR:
Burr R. Skinner,
BY E. T. Silvius,
ATTORNEY.

B. R. SKINNER.
STATION INDICATOR OR ADVERTISER.
APPLICATION FILED AUG. 28, 1912.
1,120,338.
Patented Dec. 8, 1914.
3 SHEETS—SHEET 3.
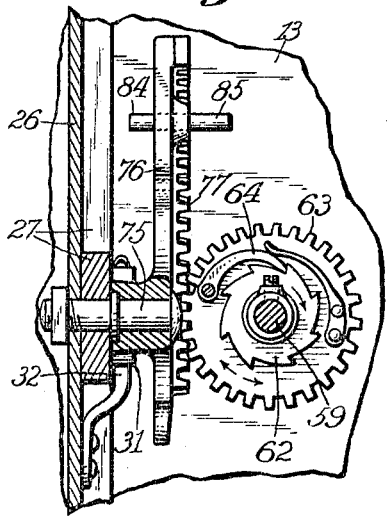
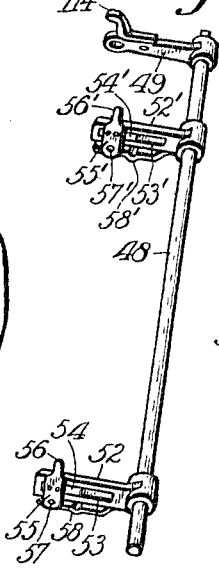
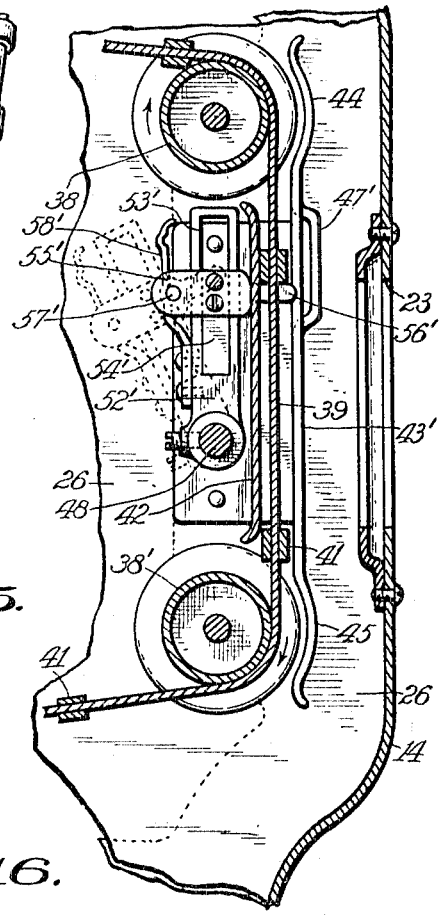
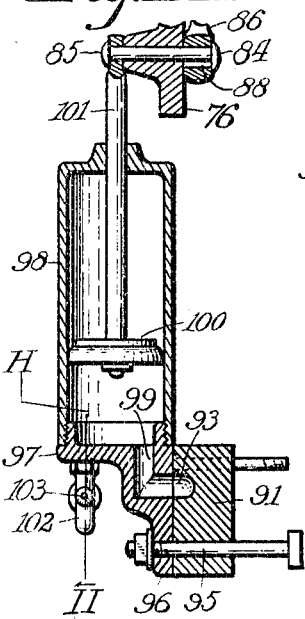
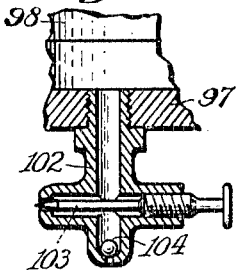
WITNESSES
J. H. Gardner
M. J. Messenheimer
INVENTOR:
Burr R. Skinner,
BY
E. T. Silvius,
ATTORNEY.

UNITED STATES PATENT OFFICE.

BURR R. SKINNER, OF ABERDEEN, SOUTH DAKOTA.

STATION-INDICATOR OR ADVERTISER.

1,120,338. Specification of Letters Patent. Patented Dec. 8, 1914.

Application filed August 28, 1912. Serial No. 717,464.

*To all whom it may concern:*

Be it known that I, BURR R. SKINNER, a citizen of the United States, residing at Aberdeen, in the county of Brown and State of South Dakota, have invented a new and useful Station-Indicator or Advertiser, of which the following is a specification, reference being had to the accompanying drawings and to the letters and figures of reference marked thereon.

This invention relates to the type of mechanical indicator or advertiser that is designed to indicate or announce the names of stations or streets on railways or other lines of travel of cars or other passenger vehicles or for displaying advertisements, the invention having reference more particularly to improvements in apparatus for moving and controlling the ribbons which carry the names of the stations or advertising matter.

An object of the present invention is to provide simple, compact and cheaply constructed mechanism for operating and controlling the name ribbon, more especially to stop the ribbon accurately in the proper position for displaying the names or advertisements thereon without tearing or otherwise damaging the ribbons.

A further object is to provide an improved station indicator or advertiser that shall be so constructed as to be adapted to be operated either by means of compressed air or by hand and which shall be reliable, durable and economical in use.

The invention consists in an improved station indicator or advertiser comprising mechanism designed to be actuated by air pressure for controlling the movement of the name ribbon and means for controlling the compressed air; the invention consisting further and more specifically in improvements in that class of machine in which a spring actuated mechanism is employed for moving the name ribbon, the spring being wound up or put under tension each time the ribbon is to be moved, the ribbon having bars thereon for precisely stopping the ribbon in the proper position, an aim of the present invention being to provide improved means for retarding the action of the spring when the ribbon is about to be stopped and thereby prevent sudden stopping of a rapidly moving ribbon. The invention consists also in the novel parts and in the combinations and arrangements of parts as hereinafter particularly described and also defined in the accompanying claims.

Figure 8:
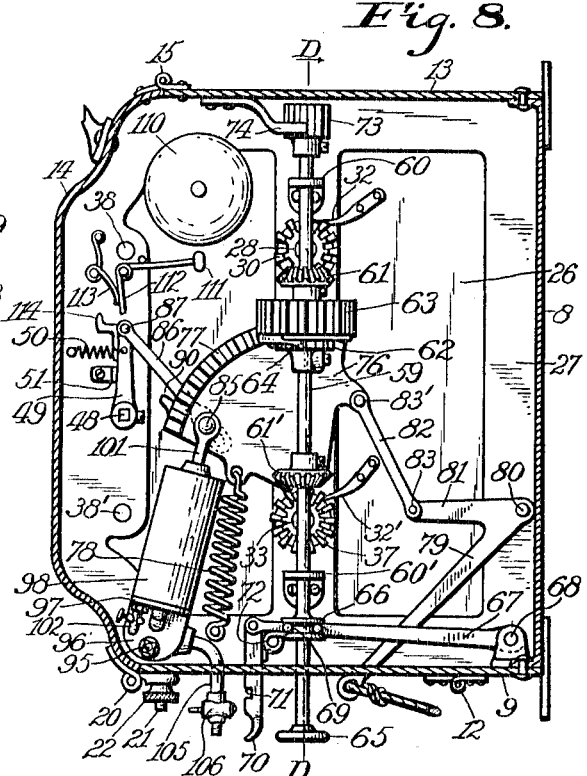
Figure 9:
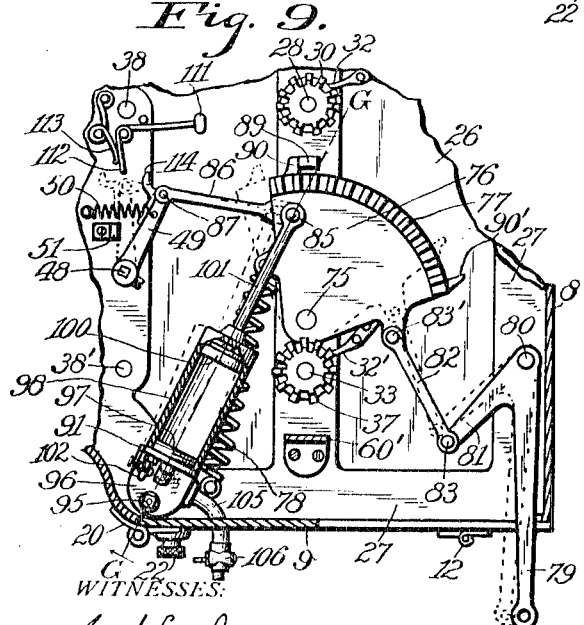
Figure 10:
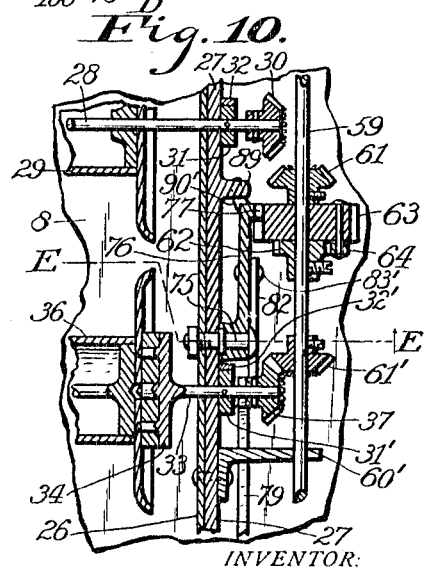

Referring to the drawings, Figure 1 is a fragmentary sectional view of a car body provided with the improved apparatus for indicating or announcing stations or streets by means of compressed air; Fig. 2, a perspective view of one of the parts of the improved mechanism; Fig. 3, a perspective view of a part associated with the part shown in the preceding figure; Fig. 4, a perspective view of the improved indicator or advertiser; Fig. 5, a fragmentary front elevation of the indicator or advertiser minus the front of the casing thereof; Fig. 6, a perspective view of one of the elements for controlling the compressed air; Fig. 7, a fragmentary section approximately on the plane of the line A—A in Fig. 4; Fig. 8, a sectional elevation approximately on the plane of the line B—B in Fig. 5; Fig. 9, a fragmentary section approximately on the line C—C in Fig. 5; Fig. 10, a fragmentary section on the plane of the line D—D in Fig. 8; Fig. 11, a fragmentary section approximately on the line E—E in Fig. 10; Fig. 12, a perspective view of a rock shaft and devices for stopping and holding the ribbon; Fig. 13, a fragmentary section approximately on the plane of the line F—F in Fig. 5; Fig. 14, a fragmentary section approximately on the line G—G in Fig. 9; Fig. 15, a perspective view of an element that coöperates with the element shown in Fig. 6 for controlling the compressed air; Fig. 16, a fragmentary section approximately on the line H—H in Fig. 14; and Fig. 17, a fragmentary elevation of parts of the mechanism for controlling the ribbon.

Throughout the different figures of the drawings, like characters of reference indicate corresponding elements or features of construction herein referred to.

In the drawings the numeral 1 indicates the floor, 2 the front end, 3 a partition and 4 the roof of a car body in which a compartment for the motorman is formed in the front end portion by the partition. A pipe 5 for supplying compressed air enters the compartment and a pipe 6 extends also into the compartment from the air brake apparatus, a controlling valve 7, as is well known, being connected with the two pipes 5 and 6 for controlling the passage of compressed air for operating the brakes.

A practical embodiment of the invention comprises a suitable casing which is preferably constructed of reinforced sheet metal so that portions of the casing constitute a frame for supporting the mechanism of the machine. The casing may suitably comprise a back 8 capable of supporting the remainder of the casing and it has a bottom comprising an end section 9 secured to the back, a relatively narrow rear bottom portion 10 secured also to the back, and a drop door 11 connected by hinges 12 to the narrow rear portion. The casing includes a top 13 secured to the back, a front door 14 being connected to the top by hinges 15, a side 16 provided with a reinforcement 17 being secured to the back 8 and the top 13 and also to the bottom portion 10, a similar side 18 provided with a reinforcement 19 being secured to the back and the top and also to the bottom portion 9. The door is suitably connected to the drop front door 11 by means of a hasp 20, a bolt 21 and a thumb nut 22. The front door has a sight opening 23 therein covered by a glass plate 24 through which the station names or advertising matter may be seen. Preferably an advertising sign 25 is mounted on the upper portion of the front door. The casing has a partition 26 provided with a reinforcement 27 secured therein at a suitable distance from the side 18 and it is secured to the bottom 9 and also to the back and the top of the casing.

A shaft 28 is rotatably mounted in the side 16 and in the partition 26 and extends through the latter and it has a roller 29 fixed thereon, the roller being arranged between said side and partition, and a bevel gear wheel 30 is secured to the shaft beyond the partition. A brake wheel 31 is secured to the shaft adjacent to the partition and a spring shoe 32 is secured to the partition and frictionally embraces the brake wheel for preventing the roller from acquiring momentum when actuated. A stub shaft 33 is rotatably mounted in the partition 26 and extends therethrough in both directions, and it has a chucking head 34 thereon presented toward the side 16, a centering shaft 35 being mounted in the side 16 and suitably retained. A roller 36 is detachably connected to the chucking head and is rotatably supported on the centering shaft. A bevel gear wheel 37 and also a brake wheel 31' are secured to the stub shaft 33, the brake wheel being frictionally embraced by a spring shoe 32' mounted on the partition for slightly retarding the roller 36. Two guide rolls 38 and 38' are rotatably mounted in the side 16 and in the partition 26 in proximity to the front door 14. A name ribbon 39 is suitably connected detachably to the two rollers 29 and 36 and extends over the guide rolls and between them and the front door, the ribbon having suitable station names 40 or other matter thereon, so as to be seen through the sight opening 23. In order to accurately stop the ribbon with the station names thereon successively within the view through the sight opening a suitable number of stop bars 41 are secured to the ribbon at uniform distances apart, the bars extending beyond the two opposite edges of the ribbon. A guide plate 42 is suitably supported fixedly behind the ribbon and between the two guide rolls 38 and 38'. A guide plate 43 is fixedly supported adjacent the side 16 and a similar guide plate 43' is fixedly supported adjacent to the partition 26, the guide plates 43 and 43' extending opposite to the end portions of the plate 42 in a plane forward of the ribbon and they have end portions 44 and 45 respectively that extend at the fronts of the end portions of the guide rolls 38 and 38'. The opposing guide plates are designed to guide the stop bars 41 of the ribbon while the stop bars are in position for stopping the ribbon in the required position. The guide plates 43 and 43' have apertures 46 and 46' therein respectively that are covered by guards 47 and 47' respectively, the guards covering also apertures formed in the guide plate 42 corresponding to the apertures 46 and 46'.

A rock shaft 48 is suitably mounted in the side 16 and the partition 26 and extends through the partition. An arm 49 is secured to the rock shaft beyond the partition and adjacent thereto, and a spring 50 is connected to the arm and to the partition and normally holds the arm against a stop 51 mounted on the partition. Two stop arms 52 and 52' are secured to the rock shaft and have guideways 53 and 53' arranged longitudinally therein respectively, head blocks 54 and 54' being slidingly mounted in the guideways and having guide plates 55 and 55' thereon provided with fingers 56 and 56' respectively, the fingers normally extending through the apertures 46 and 46' in the guide plates and holding a stop bar of the name ribbon against movement. The guide plates are provided with projections 57 and 57' that extend over opposite to the rearward side of the arms respectively and are frictionally engaged by crimped or notched spring arms 58 and 58' on the stop arms that yieldingly hold the fingers in the position to which they may be moved by the stop bars when the direction of movement of the ribbon is reversed.

A main shaft 59 is arranged vertically in the casing opposite the ends of the shaft 28 and the stub shaft 33, the latter two being relatively horizontal; and the shaft 59 extends through the bottom portion 9 and is rotatably mounted in suitably supported journal boxes 60 and 60'. A bevel gear wheel 61 is secured to the shaft 59 adjacent to the gear wheel 30, and a similar bevel gear wheel 61' is secured also to the shaft in reverse order adjacent to the gear wheel 37. The shaft 59 is movable longitudinally for shifting the bevel gear wheels thereon so that either one separately may be moved into engagement with the wheel adjacent to it. A ratchet wheel 62 is secured also to the shaft 59 and a spur toothed wheel 63 is rotatably mounted on the shaft adjacent to the ratchet wheel and has a pawl 64 mounted thereon that is spring pressed into engagement with the ratchet wheel. The lower end of the shaft 59 has a hand wheel 65 secured thereto below the casing for manually moving the shaft longitudinally or for rotating the shaft by hand when desired. Within the casing the shaft has a grooved collar 66 thereon. An arm 67 is mounted on a supported pivot 68 and is provided with fingers 69 which extend into the groove of the collar for preventing longitudinal movement of the shaft 59, the arm being provided with a latch bar 70 that has notches 71 therein to receive the adjacent portion of the bottom of the casing through which the latch bar extends, a suitable spring 72 being mounted on the arm 67 and operating to hold the latch bar in engagement with the bottom of the casing, the latch bar being adapted to be unlatched by hand. A ratchet wheel 73 is secured to the shaft 59 and is engaged by a spring dog 74 supported by the casing so as to prevent the shaft from being turned backward.

A stub shaft 75 is mounted on the partition 26 and a curved rack-bar or wheel segment 76 is rotatably mounted thereon and provided with crown teeth 77 that are constantly in connection with the teeth of the wheel 63. A powerful coiled main spring 78 is connected to one side of the rack-bar and is suitably anchored to the casing or frame, the spring being put under tension when elongated, and thus is enabled to supply power for rotating the main shaft to move the name ribbon. An operating lever 79 is mounted on a pivot 80 supported in the casing and preferably has a crank arm 81 thereon to which a stiff link 82 is connected by means of a pivot 83, the link being connected to the curved rack-bar by means of a pivot 83', for moving the rack-bar in one direction in order to put the spring under tension and for withdrawing or retracting the fingers 56 and 56' from the stop bars of the ribbon, the lever 79 extending through the bottom of the casing so as to be operated by any suitable means desired. The curved rack-bar or wheel segment is provided with two crank pins 84 and 85 on opposite sides thereof which if desired may be formed integrally, and a link 86 is connected to the arm 49 by means of a pivot 87, the link having a slot 88 therein through which the crank pin 84 extends to permit the rack-bar to move on its pivot somewhat without moving the arm 49. An abutment 89 is supported on the partition 26 and the rack-bar 76 is provided with stop fingers 90 and 90' that may be separately brought into contact with the abutment for limiting the movement of the rack-bar.

A base block 91 is fixedly secured to the partition 26 and has a port 92 extending inward from one side thereof to a groove 93 formed in the front face of the block, the block having a pivot hole 94 therein receiving a pivot 95. A pivot head 96 is connected to the block by means of the pivot extending through a pivot hole 94', the pivot head being faced to slide smoothly and closely against the front of the block and having a cylinder head 97 thereon to which a cylinder 98 is secured. A port 99 is formed in the pivot head and extends through the cylinder head so as to form communication between the groove 93 and the interior of the cylinder. A suitable piston 100 is fitted to move in the cylinder and is provided with a rod 101 that is suitably guided in the free end of the cylinder and is connected to the crank pin 85, it being understood that the rod is not packed and that air may pass between the rod and its guide so as to prevent vacuum in the movable end of the cylinder, or vent may be otherwise provided. The head 97 has a valve body 102 connected therewith in which is a valve 103 of suitable construction to permit air to slowly escape from the valve body when the piston moves toward the head 97, the valve body having also a suitable check valve 104 therein for preventing escape of air but permitting atmospheric air to enter the cylinder when the piston moves away from the head 97. A pipe 105 is connected with the port 92 and preferably is provided with a stop cock 106 which is closed when it is not desired to use compressed air in the cylinder 98. A supply pipe 107 is connected to the stop cock and extends to a point in proximity to the brake-valve 7. A controlling valve 108 of suitable construction is provided which is connected to the supply pipe 107, and it is connected by means of a branch pipe 109 with the air supply pipe 5, the valve 108 being suitably designed for admitting air under pressure from the source of supply to the cylinder 98 and for stopping the flow of air to the cylinder, and obviously the valve may be designed to permit the air to flow from the cylinder into the atmosphere after exerting its force to move the piston in the cylinder.

In order to notify the passengers when the station name is changed, a gong 110 is mounted on the partition 26, a hammer being movably mounted also on the partition so as to strike the gong after having been retracted therefrom, the hammer being pivotally supported and provided with a trip arm 112 pressed by a spring 113 to thrust the hammer against the gong, the trip arm being retracted by means of a finger 114 with which the arm 49 is provided, the trip arm 112 being somewhat elastic so that it is forced out of the way by the finger 114 during the movement of the arm 49 away from its stop. Obviously the devices for operating the gong hammer may be variously constructed.

The mechanism for actuating the main shaft 59 by means of a spring may be variously constructed and the spring may be variously arranged, and the device for putting the spring under tension may be varied as may be desired. Other modifications in the details of construction may fairly be made within the scope of the accompanying claims.

In practical use, the indicator, being secured to the upper portion of the partition 3 in the car body, is convenient to the motorman who may move the name ribbon at the proper times by means of a cord that may be connected to the lever 79. When the lever is moved to the position indicated in Fig. 9 the spring 78 is under tension and the fingers 56 and 56' are retracted, so that upon release of the lever 79 the spring pulls the rack-bar 76 over to the position shown in Fig. 8. When the rack-bar begins to move it turns the gear wheel 63 and by means of the pawl 64 turns the ratchet wheel 62 so that the main shaft 59 is rotated. The shaft rotates the roller with which it may be operatively connected so that the ribbon 39 is moved, and after a slight movement of the ribbon so as to carry the stop bar clear of the fingers 56 and 56', the latter are again moved into the path of the stop bars so that the next advancing stop bar is brought into contact with and stopped by the fingers. During the action of the spring 78 to move the ribbon, the stop cock 106 being closed, the air drawn into the cylinder by the piston on its outward stroke is permitted to slowly escape by the valve 103 which may be regulated as may be desired to retard the movement of the ribbon prior to stoppage thereof, the cylinder 98 serving as a dashpot, so that the piston therein may first move somewhat rapidly until the air becomes compressed in the cylinder and then slowly escapes. When the spring is being put under tension the wheel 63 is rotated idly on the shaft 59 and the arm 49 is not moved away from its stop until the rack-bar moves a considerable distance and carries the crank pin 84 to the end of the slot 88 in the link 86.

When it is desired to use compressed air for putting the main spring under tension the stop cock 106 is opened and the motorman operates the controlling valve 108 to admit air under pressure into the cylinder 98 whereby to force the piston outward and move the rack-bar 76 until stopped by the finger 90 coming in contact with the abutment 89. When the air pressure is released from the cylinder by the valve 108 or the air supply is cut off by the valve, the spring 78 acts to force the piston 100 back toward the head 97 and the retarding effect occurs as before explained. With each movement of the ribbon and operation of the arm 49 the gong 110 is sounded to announce the change of name or advertisement as the case may be. When it is necessary to reverse the direction of movement of the ribbon prior to the beginning of a trip, the shaft 59 is shifted longitudinally, as will be understood, and on the first movement and stoppage of the ribbon the head blocks 54 and 54' are moved to the opposite ends of the guideways 53 and 53' by the moved stop bar 41 in contact with the fingers 56 and 56' and therefore stop the fingers, the amount of movement of the fingers being equal to the width of a stop bar 41, the stopped fingers accurately stopping the bars and the ribbon so that whether the ribbon is moving in one direction or in the opposite direction the names on the ribbon are stopped exactly in the proper position to be clearly seen through the sight opening.

Having thus described the invention, what is claimed as new is:—

1. A station indicator or advertiser including a movable ribbon, a rotatable wheel segment, operating means connecting the segment with the ribbon, a supported spring for actuating the segment to move the ribbon, and fluid-pressure-actuated and controlled means adapted for moving the segment in opposition to the spring and also controlling the movement of the segment when actuated by the spring.

2. A station indicator or advertiser including a movable ribbon, a supported pivot, a wheel segment for moving the ribbon mounted to oscillate on the pivot and having a crank pin on one end portion and a link connected to the opposite end portion thereof, the link extending away on one side of the pivot, a supported cylinder adapted for a dash pot and a piston movable in the cylinder having a rod connected to the crank pin, the cylinder and the rod together extending past the opposite side of the pivot from the link, a supported spring connected to the segment for moving the latter in one direction, and a pivoted lever connected to the link for moving the segment in the opposite direction.

3. A station indicator or advertiser including a ribbon movably supported, a rotatably supported wheel segment for moving the ribbon and provided with fluid-pressure-actuated and controlled means adapted for moving the segment in one direction and also controlling the movement of the segment in the opposite direction, a spring connected to the segment to move it in said opposite direction for moving the ribbon and movable means connected with the segment for stopping the ribbon.

4. A station indicator or advertiser including a ribbon movably supported, a rotatably supported wheel segment for moving the ribbon and having a crank pin, a supported spring connected to the segment for moving the latter in one direction, means for moving the segment in the opposite direction, a cylinder adapted for a dash pot and pivotally supported, a piston rod movable in the cylinder and connected to the crank pin, and movable means connected with the segment for stopping and releasing the ribbon.

5. A station indicator or advertiser including two rotatably supported rollers, a ribbon connected to the rollers, a rotatably supported wheel segment, means for connecting either one of the two rollers with the segment for moving the ribbons, means for positively stopping the ribbon, a supported coil spring operatively connected to the segment and when under tension acting to move the segment in one direction for moving the ribbon, a supported cylinder and a piston coöperating therewith and with the segment to gradually check action of the spring only immediately preceding the stopping of the ribbon, and means for admitting compressed air into the cylinder to act on the piston for actuating the segment in the opposite direction to put the spring under tension.

6. A station indicator or advertiser including two rotatably supported rollers, a ribbon connected to the rollers, a guide for the ribbon, stop bars secured to the ribbon, a wheel segment rotatably supported, gearing for connecting the segment with either one of the two rollers, means for moving the segment to and fro, a supported rock-shaft, an operating-arm fixed on the rock-shaft, a link connected to the operating arm and the segment, two arms secured to the rock-shaft and having fingers thereon movable into the path of the stop bars, and a supported dash-pot coöperating with the wheel segment and retarding its movement in the direction that moves the ribbon.

7. In a station indicator or advertiser, the combination with two rotatably supported rollers, a name ribbon connected to the rollers, and stop bars secured to the ribbon, of a guide plate supported to guide the ribbon and having two openings therein, a wheel segment rotatably supported and having a crank pin, gearing for connecting the segment with either one of the two rollers, means for moving the segment to and fro, a supported rock-shaft, two arms secured to the rock-shaft and having fingers thereon movable through the openings into the path of movement of the stop bars, an operating-arm fixed to the rock-shaft, and a link connected to the operating-arm and having a longitudinal slot therein receiving the crank pin.

8. In a station indicator or advertiser, the combination with two rotatably supported rollers, a name ribbon connected to the rollers, and stop bars secured to the ribbon, of a guide plate supported to guide one side of the ribbon and having an aperture therein, a guide plate supported to guide the opposite side of the ribbon and having an aperture therein provided with a guard extending over the aperture, a wheel segment rotatably supported, gearing for connecting the segment with either one of the rollers, means for moving the segment to and fro, a supported rock-shaft, an arm secured to the rock-shaft and having a finger thereon movable through the apertures of the guide plates toward the guard and into the path of movement of the stop bars, and operating connections between the rock-shaft and the segment.

9. In a station indicator or advertiser, the combination with a movable ribbon, a rotatable wheel segment having a crank pin, and gearing connecting the segment with the ribbon, of a fixed base block having a port extending to the face thereof, a cylinder having a head pivoted to the base block and provided with a port extending from the port in the face to the cylinder, a piston movable in the cylinder and having a rod that is connected to said crank pin for retarding movement of said segment, a valve connected with said head, and a supported spring connected to and adapted to move said segment.

10. In a station indicator or advertiser, the combination with a name ribbon movably supported, movable gearing operatively connected with the ribbon, and a rock-shaft having an operating-arm and also fingers for stopping the ribbon, of a supported spring connected to the gearing for moving the ribbon, means for tensioning the spring, a link connecting the operating-arm with the gearing, a pivotally supported cylinder adapted to act as a dash pot and a piston movable in the cylinder and operatively connected with the gearing.

11. In a station indicator or advertiser, the combination with a movable name ribbon, a rotatable wheel segment having a crank pin, and operating means connecting the segment with the ribbon, of a supported spring connected to one end of the segment for actuating the segment for moving the ribbon, a link connected to the opposite end of the segment for tensioning the spring, a pivoted lever connected to the link for actuating it, a cylinder adapted to act as a dash pot having a head pivotally supported, a piston movable in the cylinder and having a rod connected to the crank pin, a valve body connected to said cylinder head, and an inlet valve and also an outlet valve in said body.

12. In a station indicator or advertiser, the combination with a name ribbon movably supported, movable gearing operatively connected with the ribbon, and a rock-shaft having an operating-arm and also fingers for stopping the ribbon, of a supported cylinder, a piston movable in the cylinder and operatively connected with the gearing, a link connecting the operating arm with the gearing, and means for controlling fluid-pressure in the cylinder to coöperate with the piston for moving the gearing in one direction and governing the movement of the gearing in the opposite direction.

13. In a station indicator or advertiser, the combination with a guide, a ribbon movable on the guide and having stop bars, a rotatable rock-shaft, and means for moving the ribbon and operating the rock-shaft, of a stop arm fixed on the rock-shaft and having a longitudinal guideway therein, a head block movably mounted in the guideway, a guide plate fixed on the head block and having a finger thereon normally projected into the path of movement of the stop bars, said guide plate having also a projection thereon, and a spring arm mounted on the stop arm and having frictional contact with said projection.

14. In a station indicator, the combination with a car body, a casing mounted in the body, and a fluid-pressure supply pipe carried by the body, of a name ribbon movably mounted in the casing, a wheel segment rotatably mounted in the casing and having a crank pin, gearing for connecting the segment with the ribbon for moving the ribbon, a spring connected to the casing and the segment, a base block secured fixedly in the casing and having a port therein extending to the front face thereof, a pivot plate having a cylinder head thereon and pivoted to said block, said plate and head having a port therein extending from the port in said face through said head, a cylinder secured to said head, a piston in said cylinder having a rod connected to said crank pin, a controlling valve in said car body connected with said supply pipe, and a pipe carried by said car body and connected with said controlling valve and also with the port that is in said base block.

In testimony whereof, I affix my signature in presence of two witnesses.

BURR R. SKINNER.

Witnesses:
  K. N. OHLHOUSE,
  W. W. BASSETT.

Copies of this patent may be obtained for five cents each, by addressing the "Commissioner of Patents, Washington, D. C."